United States Patent
Han et al.

(10) Patent No.: US 9,749,047 B2
(45) Date of Patent: Aug. 29, 2017

(54) OPTICAL NETWORK UNIT CAPABLE OF REDUCING OPTICAL BEAT INTERFERENCE AND METHOD FOR CONTROLLING THE SAME

(71) Applicant: INDUSTRY-ACADEMIC COOPERATION FOUNDATION, YONSEI UNIVERSITY, Seoul (KR)

(72) Inventors: Sang Kook Han, Seoul (KR); Kyoung Hak Mun, Seoul (KR); Seung Min Yang, Seoul (KR)

(73) Assignee: INDUSTRY-ACADEMIC FOUNDATION, YONSEI UNIVERSITY, Seoul (KR)

( * ) Notice: Subject to any disclaimer, the term of this patent is extended or adjusted under 35 U.S.C. 154(b) by 113 days.

(21) Appl. No.: 14/692,648

(22) Filed: Apr. 21, 2015

(65) Prior Publication Data

US 2015/0311979 A1    Oct. 29, 2015

(30) Foreign Application Priority Data

Apr. 23, 2014    (KR) .................. 10-2014-0048716

(51) Int. Cl.
*H04B 10/2507*    (2013.01)
*H04B 10/2575*    (2013.01)

(52) U.S. Cl.
CPC ..... *H04B 10/2575* (2013.01); *H04B 10/2507* (2013.01)

(58) Field of Classification Search
CPC .................. H04B 10/2575; H04B 10/2507
See application file for complete search history.

(56) References Cited

U.S. PATENT DOCUMENTS

| | | | | |
|---|---|---|---|---|
| 4,893,300 | A * | 1/1990 | Carlin | H04J 1/14 398/32 |
| 7,580,632 | B1 * | 8/2009 | Feuer | H04J 14/0227 398/30 |
| 2013/0251364 | A1 * | 9/2013 | Pachnicke | H04J 14/0276 398/32 |
| 2015/0256284 | A1 * | 9/2015 | Laubach | H04Q 11/0067 398/58 |

* cited by examiner

*Primary Examiner* — Leslie Pascal

(57) ABSTRACT

Disclosed are an optical network unit included in an OFDMA-PON system that is capable of reducing OBI (optical beat interference), and a method of controlling the optical network unit. The disclosed optical network unit includes: a signal generator part configured to generate an electrical signal carrying transmission data; an RF tone generator part configured to generate an RF tone; a combiner part configured to combine the electrical signal and the RF tone; and a photoelectric converter part configured to convert the combined signal of the electrical signal and RF tone into an optical signal.

11 Claims, 4 Drawing Sheets

OPTICAL NETWORK UNIT CAPABLE OF REDUCING OPTICAL BEAT INTERFERENCE AND METHOD FOR CONTROLLING THE SAME

CROSS-REFERENCE TO RELATED APPLICATIONS

This application claims the benefit of Korean Patent Application No. 10-2014-0048716, filed with the Korean Intellectual Property Office on Apr. 23, 2014, the disclosure of which is incorporated herein by reference in its entirety.

BACKGROUND

1. Technical Field

Embodiments of the present invention relate to an optical network unit that is capable of reducing OBI (optical beat interference), and to a method of controlling the optical network unit.

2. Description of the Related Art

An OFDMA-PON (orthogonal frequency division multiplexing access-passive optical network) system is a system in which a multiple number of optical network units (ONU) have a main carrier (optical carrier) of the same wavelength, with each of the optical network units allotted with subcarriers of different orthogonal relationships. Thus, each optical network unit may have to use a photoelectric converter part, such as a laser diode (LD) for instance, of the same wavelength.

However, since the resonator length of a laser diode has to be adjusted with high precision at the level of the wavelengths of light, it is extremely difficult to produce several laser diodes that emit wavelengths that are physically completely identical. What is more, the refractive index of the gain medium may be changed according to the magnitude of the bias current and according to temperature, resulting in slight changes in the center wavelength of the laser diode as well.

FIG. 1 schematically illustrates a problem that may occur in a conventional OFDMA-PON system. Referring to FIG. 1, a difference in the wavelengths of the main carriers between the optical network units can generate optical interference noise if the central office (CO) or the optical line termination (OLT) installed therein uses a direct detection system. If optical interference noise is present in a subcarrier signal band carrying data, the signal-to-noise ratio (SNR) may be adversely lowered, resulting in degraded performance of the system.

SUMMARY

To resolve the above problem found in the related art, an aspect of the invention aims to provide an optical network unit that is capable of reducing OBI (optical beat interference), and to a method of controlling the optical network unit.

To achieve the objective above, an embodiment of the invention provides an optical network unit that includes: a signal generator part configured to generate an electrical signal carrying transmission data; an RF tone generator part configured to generate an RF tone; a combiner part configured to combine the electrical signal and the RF tone; and a photoelectric converter part configured to convert the combined signal of the electrical signal and RF tone into an optical signal.

The optical signal and optical signals outputted from at least one other optical network units may be transmitted to an optical line termination.

The optical line termination may recover reception data by combining the optical signal and the optical signals outputted from the at least one other optical network units.

The optical line termination may recover the reception data using a photodiode.

The RF tone may have a sinusoidal waveform.

The optical signal may include one main carrier and multiple subcarriers.

The transmission data may be transmitted over the subcarriers.

Another embodiment of the invention provides a method of controlling an optical network unit, where the method includes: generating an electrical signal carrying transmission data; generating an RF tone; combining the electrical signal and the RF tone; and converting a signal of the combined electrical signal and RF tone into an optical signal.

The optical network unit and the method of controlling the optical network unit according to an embodiment of the invention can provide the advantage of reduced OBI.

Additional aspects and advantages of the present invention will be set forth in part in the description which follows, and in part will be obvious from the description, or may be learned by practice of the invention by those of ordinary skill in the art in the technical field to which the present invention pertains.

DETAILED DESCRIPTION

Figure 1:
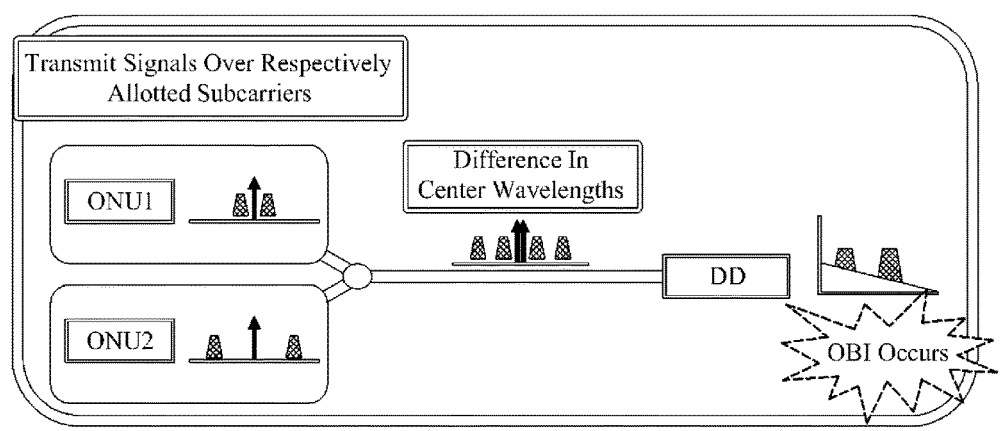
FIG. 1 schematically illustrates a problem that may occur in a conventional OFDMA-PON system.

As the present invention allows for various changes and numerous embodiments, particular embodiments will be illustrated in the drawings and described in detail in the written description. However, this is not intended to limit the present invention to particular modes of practice, and it is to be appreciated that all changes, equivalents, and substitutes that do not depart from the spirit and technical scope of the present invention are encompassed in the present invention. In describing the drawings, like reference numerals are used for like elements.

While such terms as "first" and "second," etc., may be used to describe various components, such components must not be limited to the above terms. The above terms are used only to distinguish one component from another. For example, a first component may be referred to as a second component without departing from the scope of rights of the present invention, and likewise a second component may be referred to as a first component. The term "and/or" encompasses both combinations of the plurality of related items disclosed and any item from among the plurality of related items disclosed.

Certain embodiments of the invention will be described below in more detail with reference to the accompanying drawings.

Figure 2:
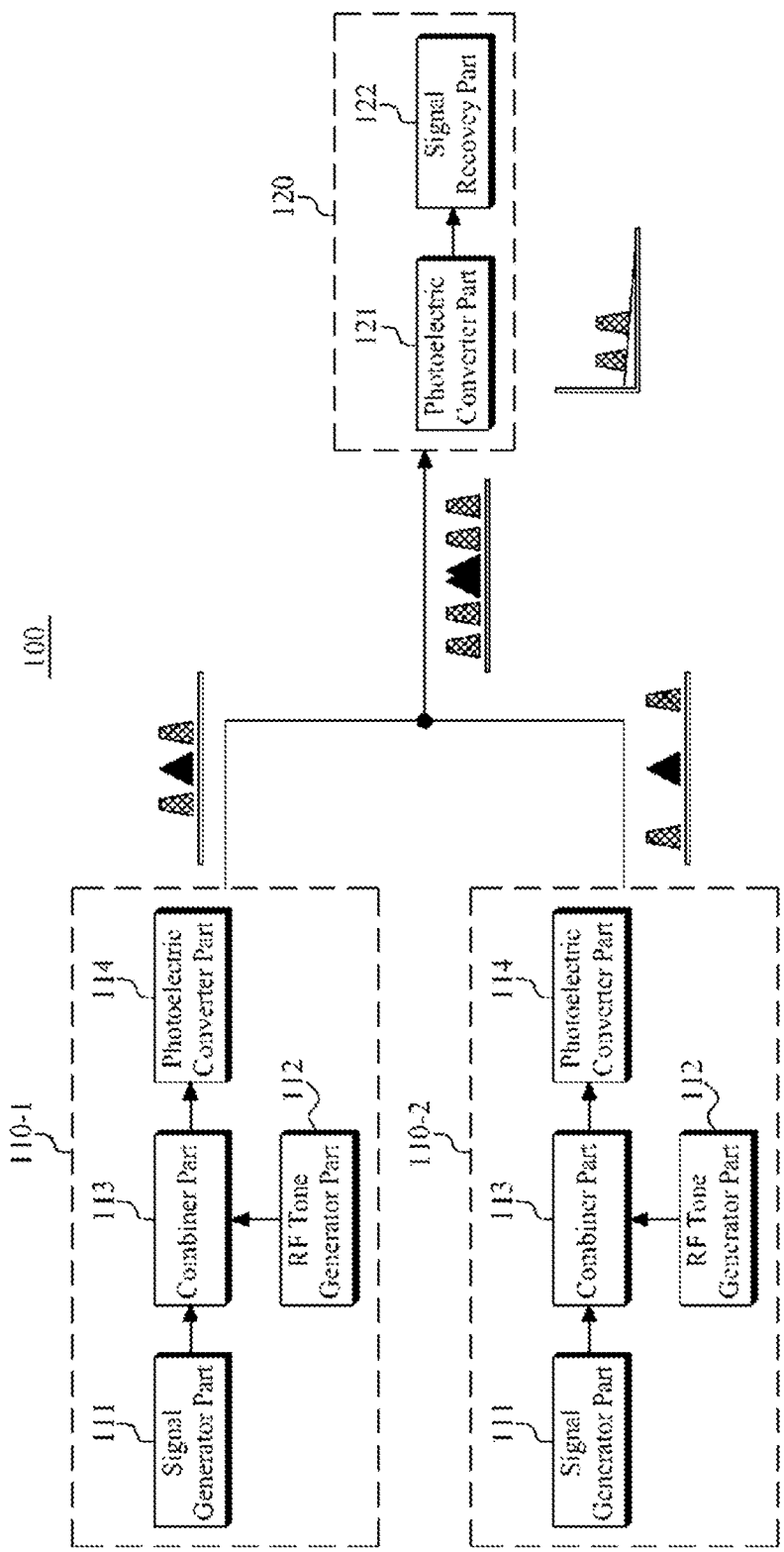
FIG. 2 schematically illustrates an OFDMA-PON system according to an embodiment of the invention.

FIG. 2 schematically illustrates an OFDMA-PON system according to an embodiment of the invention.

Referring to FIG. 2, an OFDMA-PON system 100 according to an embodiment of the invention may include two optical network units (ONU) 110 and an optical line termination (OLT) 120.

While FIG. 2 shows the number of optical network units 110 to be two, this is merely an example, and multiple optical network units 110, for example three or more optical network units 110, can be included in the OFDMA-PON system. In the descriptions that follow, it will be assumed for convenience that there are two optical network units 110.

The two optical network units 110 may cooperate with each other to transmit transmission data signals, which may be received via an optical link and an optical network (e.g. optical cables) at the optical line termination 120. That is, optical network unit A 110-1, together with at least one other optical network unit, optical network unit B 110-2, may transmit optical signals including the transmission data signals to the optical line termination 120.

Also, the optical line termination 120 may combine the optical signal transmitted from optical network unit A 110-1 and the optical signal transmitted from optical network unit B 110-1 to recover the reception data signal corresponding to the transmission data signals.

Taking a closer look, an optical network unit 110 may include a signal generator part 111, an RF tone generator part 112, a combiner part 113, and a photoelectric converter part 114.

The signal generator part 111 may generate a signal carrying transmission data. Here, the signal can be an electrical signal.

The RF tone generator part 112 may generate an RF tone. According to an embodiment of the invention, the RF tone can be an analog waveform in the shape of a sinusoidal wave.

The combiner part 113 may combine the electrical signal and the RF tone. Then, the photoelectric converter part 114 may convert the signal of the combined electrical signal and RF tone into an optical signal. According to an embodiment of the invention, the photoelectric converter part 114 can include a laser diode.

That is, an optical network unit 110 according to an embodiment of the invention can reduce the magnitude of the main carrier or widen the bandwidth of the main carrier by broadening the spectrum of the signal by way of chirping using a clipping tone.

The optical signal may include one main carrier and a multiple number of subcarriers that have orthogonal relationships with one another, and the transmission data may be transmitted to the optical line termination 120 over the multiple subcarriers.

Also, the optical line termination 120 may receive the optical signal transmitted from optical network unit A 110-1 and the optical signal transmitted from optical network unit B 110-1, and the signal recovery part 122 may combine the respective optical signals to recover a reception data signal that corresponds to the transmission data signals. Thus, when recovering data at the optical line termination 120, the OBI (optical beat interference) can be reduced or eliminated.

In short, the RF tone having a high frequency and intensity may induce a rapid change in the carrier (electric charge) density of the laser diode, and this may cause a change in the resonance frequency, together with a change in the refractive index, to increase the linewidth of the laser diode. Accordingly, the interference components of optical carriers that have been reduced in magnitude and widened in linewidth may be widely spread out under the DMT (discrete multi-tone) signal, and as a result, the signal-to-noise ratio may be increased for improved system performance.

Figure 3A:
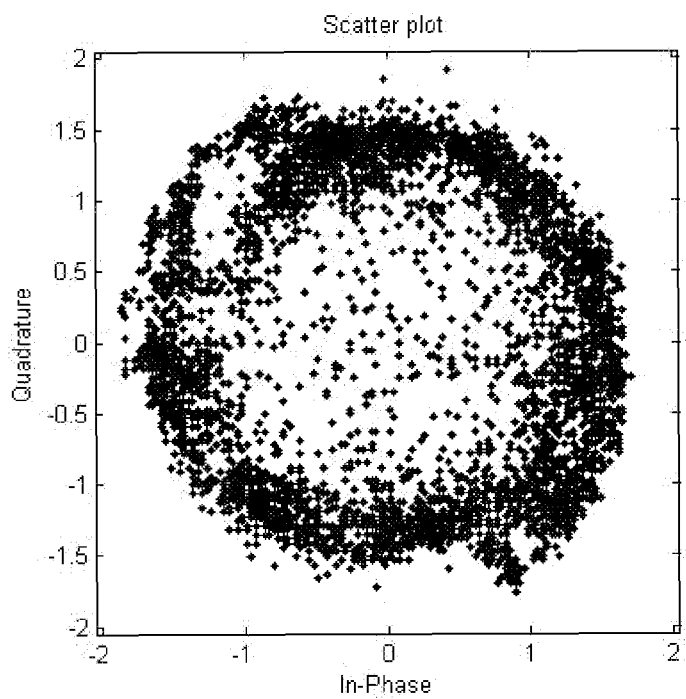
FIG. 3A and FIG. 3B show simulation results obtained by an OFDMA-PON system according to an embodiment of the invention.
Figure 3B:
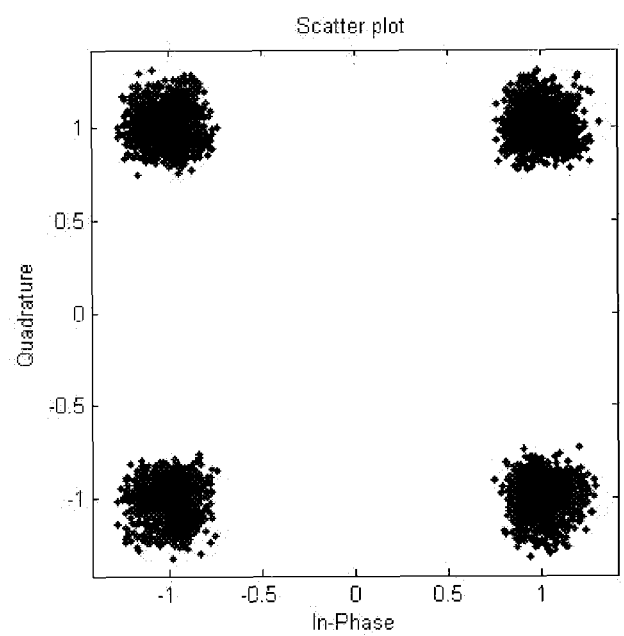

FIG. 3A and FIG. 3B show simulation results obtained by an OFDMA-PON system according to an embodiment of the invention.

To be more specific, FIG. 3A and FIG. 3B show the degree of EVM improvement when the optical interference noise is suppressed by using an OFDMA-PON system according to an embodiment of the invention.

If an optical interference noise occurs in a DMT signal, the constellation of the signals may be very shaky, as can be seen in FIG. 3A, and due to a decreased SNR, the EVM value was high, being at the level of 60-70%. The BER (bit error rate) value was over $10^{-1}$, being higher than the FEC (forward error correction) limit value.

FIG. 3B shows the constellation after the optical interference noise is suppressed using an RF tone. It can be seen that the values of the signals are closely gathered around the reference values. It can also be seen that the system performance was improved, as the EVM value was reduced to under 4%, and the BER value was under $10^{-4}$, satisfying the FEC limit.

Figure 4:
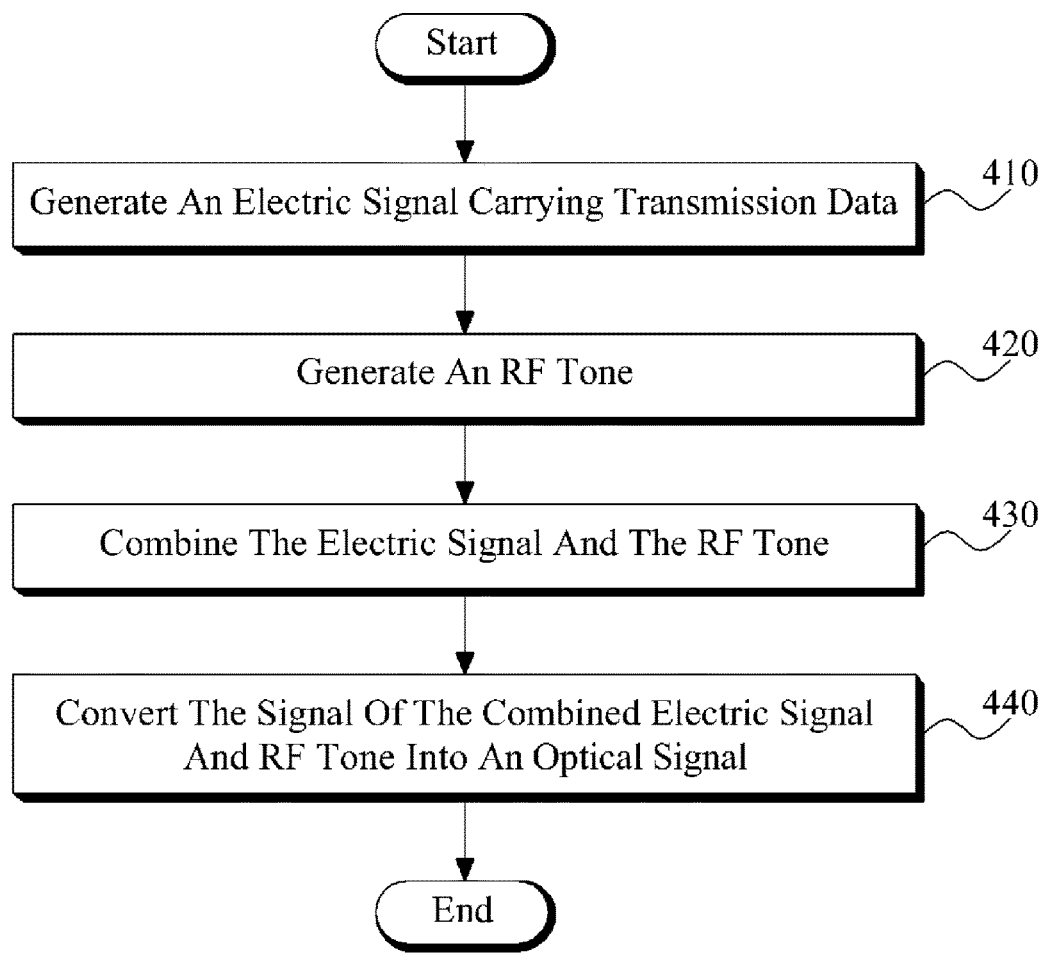
FIG. 4 is a flowchart of a method of controlling an optical network unit included in an OFDMA-PON system according to an embodiment of the invention.

FIG. 4 is a flowchart of a method of controlling an optical network unit included in an OFDMA-PON system according to an embodiment of the invention.

In operation 410, an electrical signal carrying transmission data may be generated.

In operation 420, an RF tone may be generated.

In operation 430, the electrical signal and the RF tone may be combined.

In operation 440, the signal of the combined electrical signal and RF tone may be converted into an optical signal.

According to an embodiment of the invention, the optical network unit may, together with at least one other optical network unit, transmit optical signals carrying transmission data to an optical line termination, and the optical line termination may combine the optical signal transmitted from the optical network unit and the optical signals transmitted from the at least one other optical network units to recover the reception data corresponding to the transmission data.

Also, an optical signal may include one main carrier and multiple subcarriers, and the transmission data can be transmitted over the multiple subcarriers.

The above describes an embodiment related to a method for controlling an optical network unit according to an embodiment of the invention. The features described before with reference to FIG. 2, FIG. 3A, and FIG. 3B can also apply to the present embodiment as well. Thus, redundant descriptions are omitted.

The technical features described above can be implemented in the form of program instructions that may be performed using various computer means and can be recorded in a computer-readable medium. Such a computer-readable medium can include program instructions, data files, data structures, etc., alone or in combination. The program instructions recorded on the medium can be designed and configured specifically for the present invention or can be a type of medium known to and used by the skilled person in the field of computer software.

Examples of a computer-readable medium may include magnetic media such as hard disks, floppy disks, magnetic tapes, etc., optical media such as CD-ROM's, DVD's, etc., magneto-optical media such as floptical disks, etc., and hardware devices such as ROM, RAM, flash memory, etc.

Examples of the program of instructions may include not only machine language codes produced by a compiler but also high-level language codes that can be executed by a computer through the use of an interpreter, etc. The hardware mentioned above can be made to operate as one or more software modules that perform the actions of the embodiments of the invention, and vice versa.

While the present invention has been described above using particular examples, including specific elements, by way of limited embodiments and drawings, it is to be appreciated that these are provided merely to aid the overall understanding of the present invention, the present invention is not to be limited to the embodiments above, and various modifications and alterations can be made from the disclosures above by a person having ordinary skill in the technical field to which the present invention pertains. Therefore, the spirit of the present invention must not be limited to the embodiments described herein, and the scope of the present invention must be regarded as encompassing not only the claims set forth below, but also their equivalents and variations.

What is claimed is:

1. An Orthogonal Frequency Division Multiplexing Access-Passive Optical Network (OFDMA-PON) system for reducing Optical Beat Interference (OBI) comprising:
   a plurality of optical network units configured to generate an optical signal, wherein each of the plurality optical network units further comprises:
   a signal generator part configured to generate an electrical signal carrying transmission data,
   an RF tone generator part configured to generate an RF tone,
   a combiner part configured to combine the electrical signal and the RF tone to reduce the OBI, and
   a photoelectric converter part configured to convert a signal of the combined electrical signal and RF tone into the optical signal; and
   an optical line termination configured to receive optical signals transmitted from the plurality of optical network units,
   wherein the optical line termination recovers reception data corresponding to the transmission data by combining the optical signals transmitted from the plurality of optical network units,
   wherein the optical signal in each of the plurality of optical network units comprises a plurality of subcarriers having orthogonal relationship with one another,
   wherein the RF tone has a high frequency and intensity to reduce the OBI.

2. The system of claim 1, wherein the transmission data is transmitted over the plurality of subcarriers.

3. The system of claim 1, wherein the photoelectric converter part includes a laser diode.

4. The system of claim 1, wherein the optical line termination recovers the reception data using a photodiode.

5. The system of claim 1, wherein the RF tone has a sinusoidal waveform.

6. The system of claim 1, wherein the optical signal comprises one main carrier.

7. A method of controlling an optical network for an Orthogonal Frequency Division Multiplexing Access-Passive Optical Network (OFDMA-PON) including a plurality of optical network units and an optical line termination, the method comprising:
   generating an electrical signal carrying transmission data in each of the plurality of optical network units;
   generating an RF tone having a high frequency and intensity in each of the plurality of optical network units;
   combining the electrical signal and the RF tone to reduce Optical Beat Interference (OBI) in each of the plurality of optical network units;
   converting a signal of the combined electrical signal and RF tone into an optical signal in each of the plurality of optical network units; and
   receiving optical signals from the plurality of optical network units by the optical line termination,
   wherein the optical line termination recovers reception data corresponding to the transmission data by combining the optical signals transmitted from the plurality of optical network units,
   wherein the optical signal in each of the plurality of optical network units comprises a plurality of subcarriers having orthogonal relationship with one another,
   wherein the RF tone having a high frequency and intensity induces a rapid change in a carrier density of a laser diode, and causes a change in resonance frequency together with a change in refractive index to increase linewidth of the laser diode.

8. The method of claim 7, wherein the optical line termination recovers the reception data using a photodiode.

9. The method of claim 7, wherein the RF tone has a sinusoidal waveform.

10. The method of claim 7, wherein the optical signal comprises one main carrier.

11. The method of claim 7, wherein the transmission data is transmitted over the plurality of subcarriers.

* * * * *